(12) United States Patent
Kamiya et al.

(10) Patent No.: US 7,471,697 B2
(45) Date of Patent: Dec. 30, 2008

(54) MULTIPLEX TRANSMISSION SYSTEM FOR REPORTING ALERT INFORMATION TO THE CONVERSION DEVICE ON THE RECEIVING SIDE WITHOUT USING A DEDICATED FRAME

(75) Inventors: Satoshi Kamiya, Tokyo (JP); Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 1022 days.

(21) Appl. No.: 10/385,514

(22) Filed: Mar. 12, 2003

(65) Prior Publication Data

US 2003/0174728 A1 Sep. 18, 2003

(30) Foreign Application Priority Data

Mar. 13, 2002 (JP) ............................. 2002-068460

(51) Int. Cl.
*H04J 3/16* (2006.01)
(52) U.S. Cl. ...................................... 370/467; 370/216
(58) Field of Classification Search ....................... None
See application file for complete search history.

(56) References Cited

U.S. PATENT DOCUMENTS

| 4,896,277 | A | * | 1/1990 | Vercellotti et al. | 710/9 |
| 5,663,724 | A | * | 9/1997 | Westby | 341/59 |
| 6,654,779 | B1 | * | 11/2003 | Tsuei | 718/101 |

FOREIGN PATENT DOCUMENTS

| JP | 62-078935 | 4/1987 |
| JP | 01-218247 | 8/1989 |
| JP | 03-112240 | 5/1991 |
| JP | 04-345219 | 12/1992 |
| JP | 2000-115108 | 4/2000 |
| JP | 2001-045069 | 2/2001 |

(Continued)

OTHER PUBLICATIONS

Full Translation of Japanese Patent entitled Relay Transmission Line Monitoring System (JP 62-78935) dated Apr. 11, 19861987 pp. 2-5.*

(Continued)

*Primary Examiner*—Jay Patel
*Assistant Examiner*—Robert W Wilson
(74) *Attorney, Agent, or Firm*—McGinn IP Law Group, PLLC

(57) ABSTRACT

A multiplex transmission system is disclosed in which, in the event of a problem between a converter and a client device on the transmitting side, the occurrence of this problem is reported to a converter on the receiving side without using specially dedicated frames. When a problem occurs between the converter on the transmitting side and an FC device on the transmitting side and the loss of optical input (LOS) or the loss of character synchronization (LCS) is detected, the converter on the transmitting side uses values that are not being used of the control character indicators of compression control codes in 64B/65B codes following 64B/65B conversion to transmit to the converter on the receiving side the alert information LOS or LCS. The converter on the receiving side, upon detecting this alert information, transmits a 10B-ERR signal or halts optical output to the FC device on the receiving side.

19 Claims, 16 Drawing Sheets

FOREIGN PATENT DOCUMENTS

| JP | 2001-230678 | 8/2001 |
|---|---|---|
| JP | 2003-018162 | 1/2003 |
| JP | 2003-087276 | 3/2003 |

OTHER PUBLICATIONS

Full translation of Japanese Patent entitled Digital Transmission System (JP 63-43377) dated Feb. 26, 1988 pp. 1-9.*

Full Translation of Japanese Patent entitled Relay Transmission Line Monitoring System (JP 62-78935) dated Apr. 11, 1987 pp. 2-5 (Previously Provided).*

Full Translation of Japanese Patent entitled Digital Transmission System (JP-63-43377) dated Feb. 26, 1988 pp. 1-9 (Previously Provided).*

Full Translation of Japanese Patent entitled Relay Transmission Line Monitoring System (JP-62-78935) dated Apr. 11, 1987 pp. 2-5 (Previously Provided).*

Full Translation of Japanese Patent entitled Digital Transmission System (JP-63-43377) dated Feb. 28, 1988 pp. 1-9 (Previously Provided).*

Japanese Office Action dated Jun. 28, 2006 with partial English translation.

* cited by examiner

Fig. 7
PRIOR ART

| control code | octet value | 10B code (RD-)<br>abcdei fghj | 10B code (RD+)<br>abcdei fghj | 64B/65B control character indicator |
|---|---|---|---|---|
| /K28.0/ | 1C | 001111 0100 | 110000 1011 | 0000 |
| /K28.1/ | 3C | 001111 1001 | 110000 0110 | 0001 |
| /K28.2/ | 5C | 001111 0101 | 110000 1010 | 0010 |
| /K28.3/ | 7C | 001111 0011 | 110000 1100 | 0011 |
| /K28.4/ | 9C | 001111 0010 | 110000 1101 | 0100 |
| /K28.5/ | BC | 001111 1010 | 110000 0101 | 0101 |
| /K28.6/ | DC | 001111 0110 | 110000 1001 | 0110 |
| /K28.7/ | FC | 001111 1000 | 110000 0111 | 0111 |
| /K23.7/ | F7 | 111010 1000 | 000101 0111 | 1000 |
| /K27.7/ | FB | 110110 1000 | 001001 0111 | 1001 |
| /K29.7/ | FD | 101110 1000 | 010001 0111 | 1010 |
| /K30.7/ | FE | 011110 1000 | 100001 0111 | 1011 |
| 10B_ERR | N/A | Unrecognized RD- | Unrecognized RD+ | 1100 |
| 65B_PAD | N/A | N/A | N/A | 1101 |
| Spare | N/A | N/A | N/A | 1110 |
| Spare | N/A | N/A | N/A | 1111 |

Fig. 11

| control code | octet value | 10B code (RD-) abcdei fghj | 10B code (RD+) abcdei fghj | 64B/65B control character indicator |
|---|---|---|---|---|
| /K28.0/ | 1C | 001111 0100 | 110000 1011 | 0000 |
| /K28.1/ | 3C | 001111 1001 | 110000 0110 | 0001 |
| /K28.2/ | 5C | 001111 0101 | 110000 1010 | 0010 |
| /K28.3/ | 7C | 001111 0011 | 110000 1100 | 0011 |
| /K28.4/ | 9C | 001111 0010 | 110000 1101 | 0100 |
| /K28.5/ | BC | 001111 1010 | 110000 0101 | 0101 |
| /K28.6/ | DC | 001111 0110 | 110000 1001 | 0110 |
| /K28.7/ | FC | 001111 1000 | 110000 0111 | 0111 |
| /K23.7/ | F7 | 111010 1000 | 000101 0111 | 1000 |
| /K27.7/ | FB | 110110 1000 | 001001 0111 | 1001 |
| /K29.7/ | FD | 101110 1000 | 010001 0111 | 1010 |
| /K30.7/ | FE | 011110 1000 | 100001 0111 | 1011 |
| 10B_ERR | N/A | Unrecognized RD- | Unrecognized RD+ | 1100 |
| 65B_PAD | N/A | N/A | N/A | 1101 |
| CSF – LOS | N/A | N/A | N/A | 1110 |
| CSF – LCS | N/A | N/A | N/A | 1111 |

MULTIPLEX TRANSMISSION SYSTEM FOR REPORTING ALERT INFORMATION TO THE CONVERSION DEVICE ON THE RECEIVING SIDE WITHOUT USING A DEDICATED FRAME

BACKGROUND OF THE INVENTION

1. Field of the Invention

The present invention relates to a multiplex transmission system for converting data that have been encoded using 8B/10B encoding rules to data based on a transmission path standard after 64B/65B conversion and transmitting the data as well as to the converter used in this multiplex transmission system; and more particularly to a method of transmitting an alert for transmitting information regarding a problem to a client device on the receiving side when any type of problem occurs between a converter and a client device on the transmitting side.

2. Description of the Related Art

In recent years, Fibre Channel (FC) is being used as interface for forming connections between external storage devices as well as between storage devices and computers. Such Fibre Channel is a high-speed data communication technology that has been standardized by the American National Standards Institute (ANSI) and that has received widespread attention due to its potential for cutting costs and offering a real-time network environment.

However, the standards for transmission paths for realizing long-distance high-speed transmission do not necessarily assume the use of the Fibre Channel, and converters are therefore required for first multiplexing Fibre Channel signals and converting them to signals based on standards such as for Gigabit Ethernet (GbE) or Synchronous Optical Network (SONET)/Synchronous Digital Hierarchy (SDH), transmitting the converted signals on a transmission path, and then converting the GbE or SONET/SDH signals to the original Fibre Channel signals on the receiving side.

However, 8B/10B block encoding is adopted in the physical layer of the above-described Fibre Channel. Details regarding 8B/10B block encoding are described in ANSI X3.230-1994 of the Fibre Channel Physical and Signaling Interface (FC-PH).

In 8B/10B block encoding, every 8 bits of data, for which 8 bits is the unit, are converted in accordance with prescribed encoding rules to 10-bit units of code. The original 8 bits is referred to as a "byte" and the 10 bits of code into which the bytes are converted is referred to as a "character". In the present specification, these are referred to as "8B bytes" and "10B characters".

According to 8B/10B encoding rules, the same bit value ("0" or "1") does not continue for six or more times in the signals of 10B characters. In 8B/10B encoding rules, moreover, every 8B byte has two 10B characters determined in which the number of "0" and "1" are reciprocal. One of the two 10B characters is then selected according to the numbers of "0" and "1" in the preceding 10B character, as "Running Disparity". A multiplicity of change points thus occurs in 10B character signals, and clocks and data are therefore easier to extract on the receiving side.

The 10B characters of 8B/10B block codes are defined such that 256 types of data codes and 12 types of control codes can be represented. Normally, data codes are represented by Dxx. y and control codes are represented by Kxx. y. Each data code corresponds to an 8B byte of the 256 8B bytes that are represented by 8 bits. Combinations of 10 bits that are not used as data codes are assigned to control codes. Control codes are used for transmitting control information for patterns for synchronizing characters or for link failures. By means of 8B/10 block encoding, not only are data transmitted transparently, but various control information is also transmitted.

FIG. 1 shows a multiplex transmission system in which FC devices, which are client devices that use this type of FC signal, are connected by way of a transmission path.

This multiplex transmission system realizes transmission and reception of data between FC device 101 and FC device 102, and, because the interposed transmission path is a GbE transmission path, the multiplex transmission system is further provided with converters 1201 and 1202. FC devices 101 and 102 are client devices that use Fibre Channel signals to transmit and receive data between converters 1201 and 1202.

Converter 1201 converts FC signals from FC device 101 to GbE signals and then sends the GbE signals onto the transmission path, and converts GbE signals that are received by way of the transmission path to FC signals and then sends the FC signals to FC device 101. Converter 1202 converts FC signals from FC device 102 to GbE signals and then sends the GbE signals onto the transmission path, and converts GbE signals that are received by way of the transmission path to FC signals and then sends the FC signals to FC device 102.

FIG. 2 shows the construction of converter 1201 that is shown in FIG. 1. As shown in FIG. 2, this converter 1201 is composed of O/E converter 131, S/P converter 32, FC-GbE converter 133, MAC (Media Access Control) address adder 34, MAC generator 35, 8B/10B encoder 36, P/S converter 37, E/O converter 38, O/E converter 41, S/P converter 42, 8B/10B decoder 43, MAC terminating unit 44, MAC address terminating unit 45, GbE-FC converter 146, P/S converter 47, and E/O converter 148.

O/E converter 131 converts optical signals from FC device 101 to electrical signals. S/P converter 32 converts serial electrical signals from O/E converter 131 to parallel signals. FC-GbE converter 133 converts parallel FC signals from S/P converter 32 to GbE signals. MAC address adder 34 performs processing for adding MAC addresses to GbE signals following the conversion by FC-GbE converter 133. MAC generator 35 performs MAC processing of data that have been given MAC address by MAC address adder 34. 8B/10B encoder 36 performs 8B/10B encoding of signals from MAC generator 35. P/S converter 37 converts the parallel signals that have been encoded by 8B/10B encoder 36 to serial signals. E/O converter 38 converts serial electrical signals from P/S converter 37 to optical signals.

O/E converter 41 converts optical signals that have been received from converter 1202 by way of the transmission path to electrical signals. S/P converter 42 converts the serial electrical signals from O/E converter 41 to parallel signals. 8B/10B decoder 43 performs 8B/10B decoding of signals from S/P converter 42. MAC terminating unit 44 performs MAC termination of signals that have been decoded by 8B/10B decoder 43. MAC address terminating unit 45 performs termination of the MAC addresses of data from MAC terminating unit 44. GbE-FC converter 146 performs processing to convert GbE signals from MAC address terminating unit 45 to FC signals. P/S converter 47 performs processing to convert parallel signals that have been converted by GbE-FC converter 146 to serial signals. E/O converter 148 performs processing to convert serial electrical signals from P/S converter 47 to optical signals.

FIG. 3 shows the construction of FC-GbE converter 133 that is shown in FIG. 2. As shown in FIG. 3, FC-GbE converter 133 is composed of 8B/10B decoder 51, word synchronization detector 152, 64 B/65B encoder 153, FIFO memory 54, FIFO control unit 55, and frame generator 56.

8B/10B decoder 51 performs 8B/10B decoding of the 10-bit parallel signals from S/P converter 32. Word synchronization detector 152 performs processing to detect word synchronization of the 9-bit data that has been subjected to 8B/10B decoding by 8B/10B decoder 51. 64B/65B encoder 153 performs 64B/65B encoding of data from word synchronization detector 152. FIFO memory 54 sequentially reads the data that have been 64B/65B encoded by 64B/65B encoder 153 and supplies these data as output. FIFO control unit 55 controls FIFO memory 54. Frame generator 56 cuts the data that have been supplied as output from FIFO memory 54 into frame units for every fixed length of data and transmits these data.

We next refer to FIG. 4, which shows the construction of GbE-FC converter 146 that is shown in FIG. 2. As shown in FIG. 4, GbE-FC converter 146 is composed of frame identifier 61, 64B/65B decoder 62, speed regulator 63, and 8B/10B encoder 164.

Frame identifier 61 identifies the frames of the data from MAC address terminating unit 45. 64B/65B decoder 62 performs 64B/65B decoding of signals from frame identifier 61. Speed regulator 63 performs regulation processing to match the transmission rate of signals that have been decoded by 64B/65B decoder 62 to the multiplexing hierarchy. 8B/10B encoder 164 performs 8B/10B encoding of data following the regulation of transmission rate by speed regulator 63.

In this case, 64B/65B code conversion is the conversion of eight 10B characters to 65-bits block-coded data. The 65-bits block-coded data that have undergone 64B/65B conversion are referred to as "64B/65B code". Thus, in 64B/65B conversion, eight 10B characters are received as input and a 64B/65B code is supplied as output. This conversion reduces the number of bits from 80 to 65 and compresses the bandwidth to 81.25% (i.e., 65/80).

FIG. 5 shows the composition of a 64B/65B code. Referring to FIG. 5, the leading bit of the 64B/65B code is "0" only when all eight 10B characters that have been received are data codes. The leading bit is "1" when one or more control codes are included among the eight 10B characters. The 64 bits from the second to the 65th bit are divided by every eight bits into eight byte regions. The second bit to the ninth bit is the first byte, the tenth bit to the 17th bit is the second byte, and so on until the 58th bit to the 65th bit, which is the eighth byte.

Each byte region stores the 8-bit code of a converted 10B character. If a control code is included among the eight 10B characters that have been received as input, however, the order in which the 10B characters were received differs from the order in which the 8-bit codes of the converted 10B characters are stored. The control codes are stored together in order from the first byte, and the data codes are stored together following the control codes.

Regarding the codes that are to be stored, when the 10B characters are data codes, the 8B bytes that are decoded from these 10B characters are stored in the byte regions. When the 10B characters are control codes, 8-bit codes that are referred to as compression control codes are stored in the byte regions.

FIG. 6 shows the composition of compressed control code. Referring to FIG. 6, compressed control code is composed of three regions: a last control character", a control character locator, and a control character indicator.

The first bit is the "last control character". Control codes are stored together at the head of a 64B/65B code. When a control code succeeds in the next byte region, the "last control character" is "1"; and when that control code is the final one, the "last control character" is "0".

The three bits from the second bit to the fourth bit are the control character locator. The location of the control codes among the eight 10B characters before transposition is indicated by binary data from "000 (=0)" to "111 (=7)".

As an example, when the eight 10B characters are received as input in the order: D1, D2, D3, K1, D4, D5, D6, and K2 (where D indicates data codes and K indicates control codes), the data are stored in the first to eighth bytes of the 64B/65B code in the order: K1, K2, D1, D2, D3, D4, D5, and D6. Here, the "last control character" of K1 is "1" and the control character locator of K1 is "011 (=3)". The "last control character" of K2 is "0", and the control character locator of K2 is "111 (=7)".

The four bits from the fifth bit to the eighth bit are the control character indicator. The control codes are codes that are represented by four bits.

The 64B/65B conversion that was described in the foregoing explanation causes a reduction of the number of bits of control codes and stores locators in 8-bit codes, whereby 10B character signals in which data code and control code are mixed are bandwidth compressed while maintaining transparency.

We next refer to the table of FIG. 7, which shows the relation between the 8B/10B control characters and 64B/65B control codes. FIG. 7 shows Table 8-1 in G. 7041 of the ITU-T recommendations and shows the relation between 8B/10B control characters and 64B/65B control codes.

When a problem occurs such as a break in the optical fiber cable between FC device 101 and converter 1201 in a prior-art multiplex transmission system of this type, data that have been transmitted by FC device 101 do not reach converter 1201. As a consequence, no data at all are transmitted from converter 1201 to converter 1202, and converter 1202, being unable to recognize that a problem has occurred such as a break in the optical fiber cable, transmits idle data to FC device 102. FC device 102 therefore determines that FC device 101 is simply not transmitting data.

Further, FC device 101 lacks any means for determining whether or not data have arrived at FC device 102, and therefore cannot detect that a problem has occurred and continues to transmit data despite the inability of FC device 102 to receive data.

In the example of the prior art that is shown in FIG. 1, the explanation presents a case in which the Fibre Channel is used as the interface standard between FC device 101 and converter 1201 and between FC device 102 and converter 1202, but standards other than the Fibre Channel include ESCON (Enterprise System CONnection), FICON (FIber CONnection), and DVB-ASI (Digital video Broadcasting-Asynchronous Serial Interface) as the interface standard between a computer and peripheral equipment. Similar problems occur even when employing interface standards other than the Fibre Channel. (ESCON and FICON are registered trademarks of IBM Corporation.)

Finally, in the example of the prior art that is shown in FIG. 1, a case was described in which the transmission path between converters 1201 and 1202 was GbE. However, when this transmission path is SONET, the use of an alert frame allows alert information to be transferred. However, the transfer of alert information necessitates the use of a special frame such as an alert frame, and this entails the problem that the transmission rate is consequently reduced.

SUMMARY OF THE INVENTION

It is an object of the present invention to provide a multiplex transmission system and a converter that, when a problem occurs between a client device and a converter on the transmitting side, enable reporting the occurrence of this problem to a converter on the receiving side without using special frames; as well as to provide a method of transmitting an alert.

A multiplex transmission system that applies the present invention first subjects data from a client device that have been encoding using 8B/10B encoding rules to data that are based on the standard of the transmission path after 64B/65B conversion by means of a converter and then transmits the data.

To achieve the above-described object in the multiplex transmission system of the present invention, the converter on the transmitting side includes means for transmitting, to a converter on the receiving side, alert information that uses a value that is not being used among the compression control codes in a 64B/65B code to indicate that a problem has occurred when a problem occurs between the client device and the converter on the transmitting side.

Accordingly, when a problem occurs between the client device and the converter on the transmitting side, the occurrence of this problem can be reported to the converter on the receiving side without using a special frame.

Further, in the multiplex transmission system of the present invention, the alert information may be information that indicates the occurrence of a loss of optical input, which is a state in which optical signals to the converter from the client device on the transmitting side have been interrupted, or the loss of character synchronization, which is a state in which data from the client device cannot be synchronized in the converter.

In addition, in the multiplex transmission system of the present invention, the converter on the receiving side may, upon receiving alert information from the converter on the transmitting side, halt the output of optical signals to the client device on the receiving side, or may transmit a signal indicating that a problem has occurred to the client device on the receiving side.

Still further, in the multiplex transmission system of the present invention, the client device on the receiving side, upon detecting a halt of input of optical signals from the converter on the receiving side or upon receiving a signal from the converter on the receiving side indicating that a problem has occurred, may respond to the client device on the transmitting side by indicating that data have not arrived.

According to the present invention, the client device on the transmitting side can recognize the occurrence of a problem by receiving an indication from the client device on the receiving side that data have not arrived, whereby the client devices on both the receiving side and transmitting side can recognize that a problem has occurred. As a result, a recovery sequence can be performed upon recovery from the problem.

Further, in the multiplex transmission system of the present invention, the client devices may be Fibre Channel devices that transmit data to and receive data from converters using Fibre Channel signals.

The above and other objects, features, and advantages of the present invention will become apparent from the following description with reference to the accompanying drawings, which illustrate examples of the present invention.

BRIEF DESCRIPTION OF THE DRAWINGS

FIG. 7 is a table showing the relation between 8B/10B control characters and 64B/65B control codes in the multiplex transmission system of the prior art;

FIG. 11 is a table showing the relation between 8B/10B control characters and 64B/65B control codes in the multiplex transmission system of the first embodiment of the present invention;

DETAILED DESCRIPTION OF THE PREFERRED EMBODIMENTS

Figure 8:
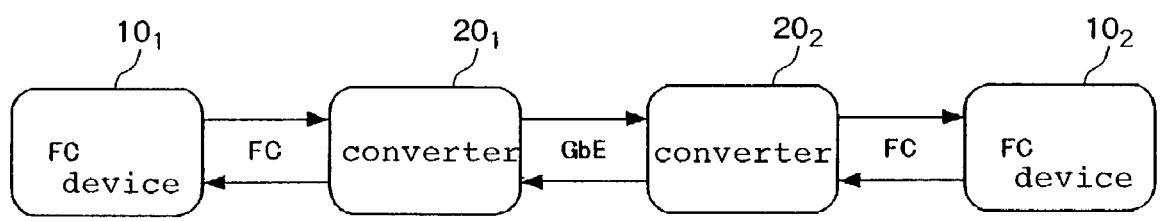
FIG. 8 is a block diagram showing the construction of the multiplex transmission system of the first embodiment of the present invention.

First Embodiment:

We next refer to FIG. 8, in which is shown a block diagram that shows the construction of the multiplex transmission system of the first embodiment of the present invention. In FIG. 8, constituent elements that are equivalent to constituent elements in FIG. 1 are identified by the same reference numerals, and redundant explanation is here omitted.

Figure 1:
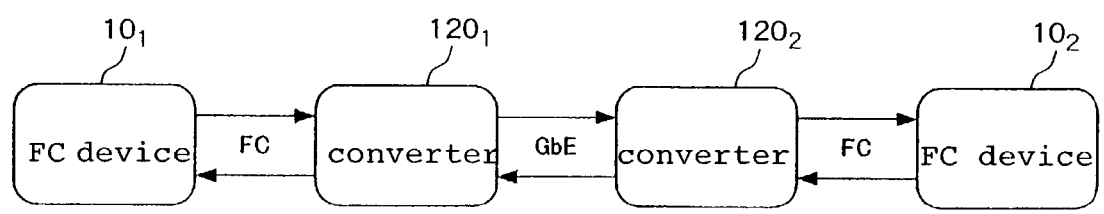
FIG. 1 is a block diagram showing the construction of a multiplex transmission system of the prior art.

The multiplex transmission system of the present embodiment is a system in which converters 1201 and 1202 in the prior-art multiplex transmission system that is shown in FIG. 1 are replaced by converters 201 and 202.

Figure 2:
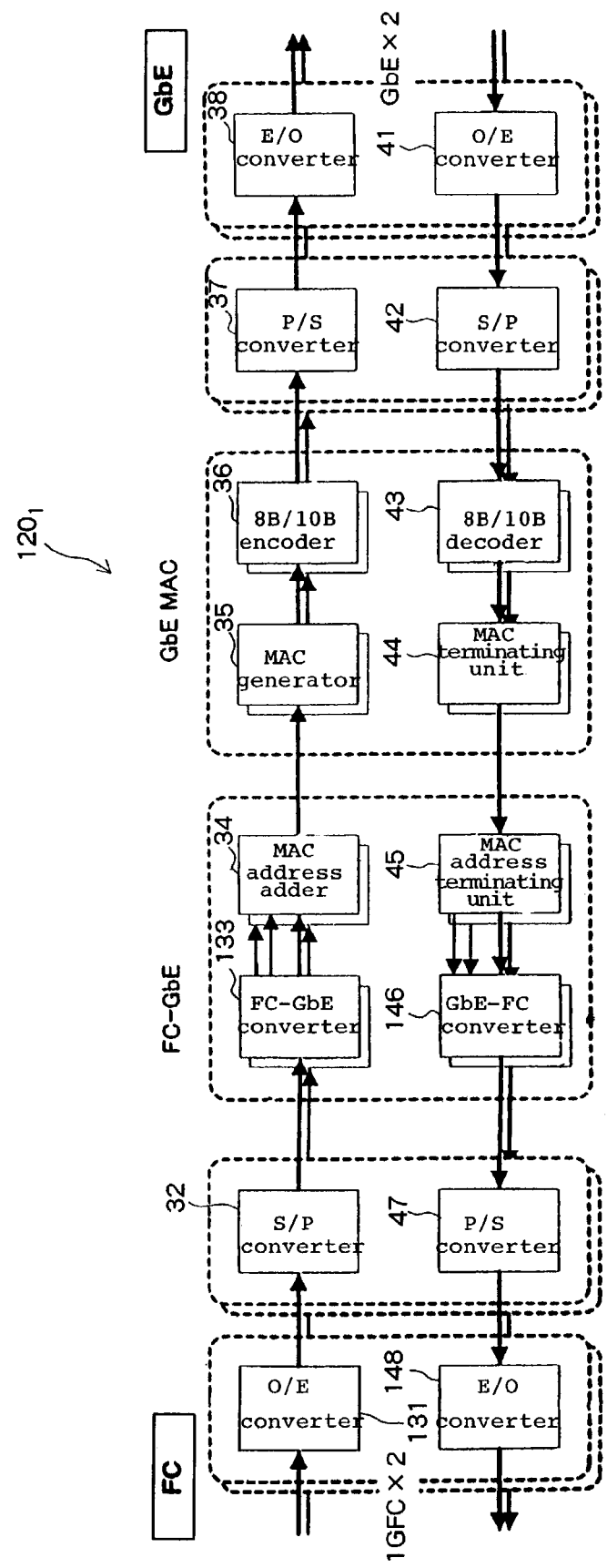
FIG. 2 is a block diagram showing the construction of converter 1201 in the multiplex transmission system of the prior art.
Figure 9:
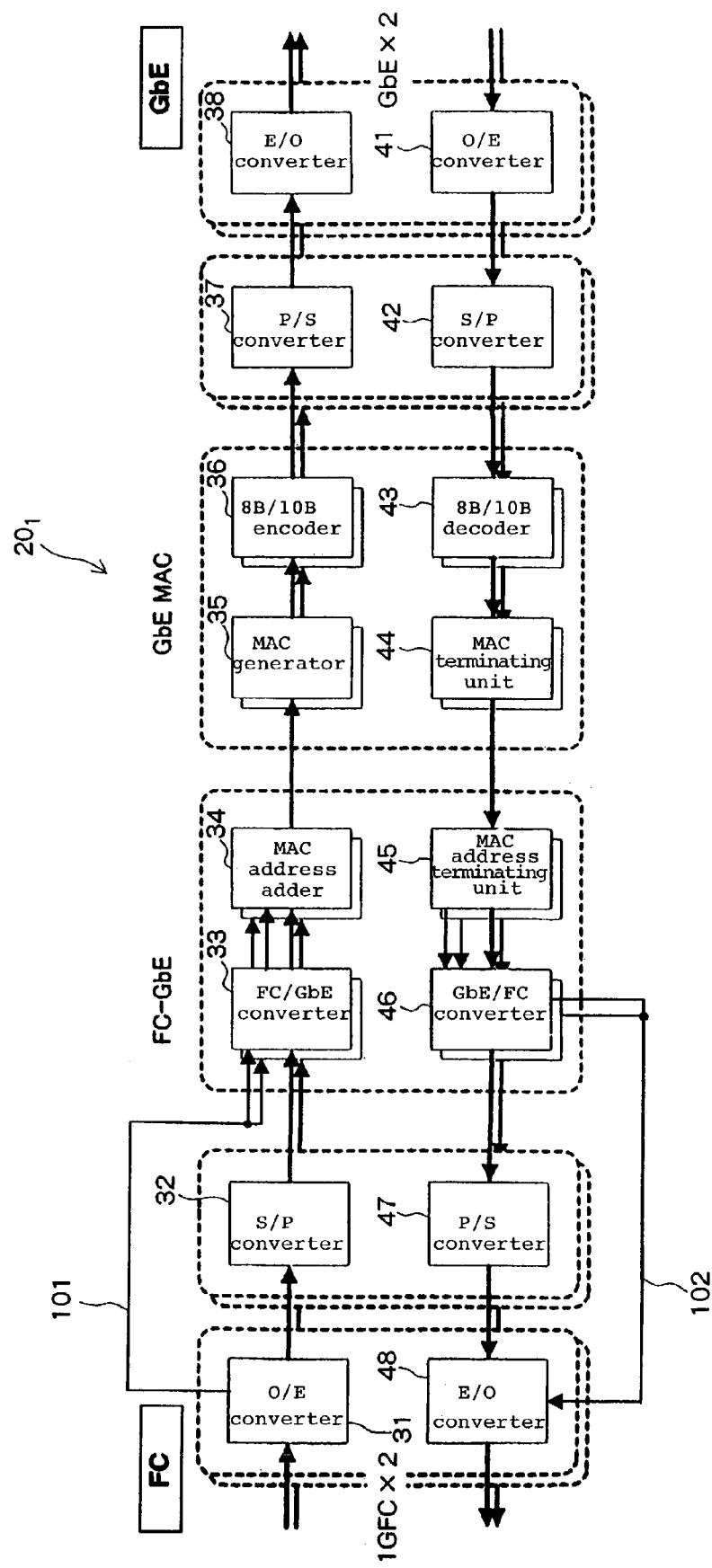
FIG. 9 is a block diagram showing the construction of converter 201 in the multiplex transmission system of the first embodiment of the present invention.

As shown in FIG. 9, converter 201 in this embodiment is a construction in which O/E converter 131, FC-GbE converter 133, GbE-FC converter 146, and E/O converter 148 of prior-art converter 1201 that is shown in FIG. 2 are replaced by O/E converter 31, FC-GbE converter 33, GbE-FC converter 46, and E/O converter 48, respectively. Converter 202 has the same construction as converter 201 and redundant explanation of this converter is therefore here omitted.

In addition to the functions of O/E converter 131 in converter 1201 of the prior art that is shown in FIG. 2, O/E converter 31 is further provided with the capability to determine that a problem has occurred such as a disconnection of the optical fiber cable between FC device 101 and converter 201 when it is unable to receive optical signals from FC device 101, which is the client device, and then to supply LOS (Loss of Signal) detection signal 101 as output to FC-GbE converter 33.

In addition to the functions of FC-GbE converter 133 in converter 1201 of he prior art that is shown in FIG. 2, FC-GbE converter 33 is further provided with the capability to insert alert information such as CSF (Client Signal Fail)-LOS or CSF-LCS into values that are not being used of the control character indicator of compression control codes in 64B/65B codes after 64B/65B conversion when FC-GbE converter 133 has received LOS detection signal 101 as input from O/E converter 31 or has detected the loss of character synchronization (LCS) of data from S/P converter 32.

In addition to the functions of GbE-FC converter 146 in converter 1201 of the prior art that is shown in FIG. 2, GbE-FC converter 46 is further provided with the capability to supply optical output halt signal 102 as output to E/O converter 48 when it detects that the alert information CSF-LOS or CSF-LCS has been inserted in data from converter 202.

In addition to the functions of E/O converter 148 in converter 1201 of the prior art that is shown in FIG. 2, E/O converter 48 is further provided with the capability to halt optical output to FC device 101 when it receives optical output halt signal 102 as output from GbE-FC converter 46.

Figure 10:
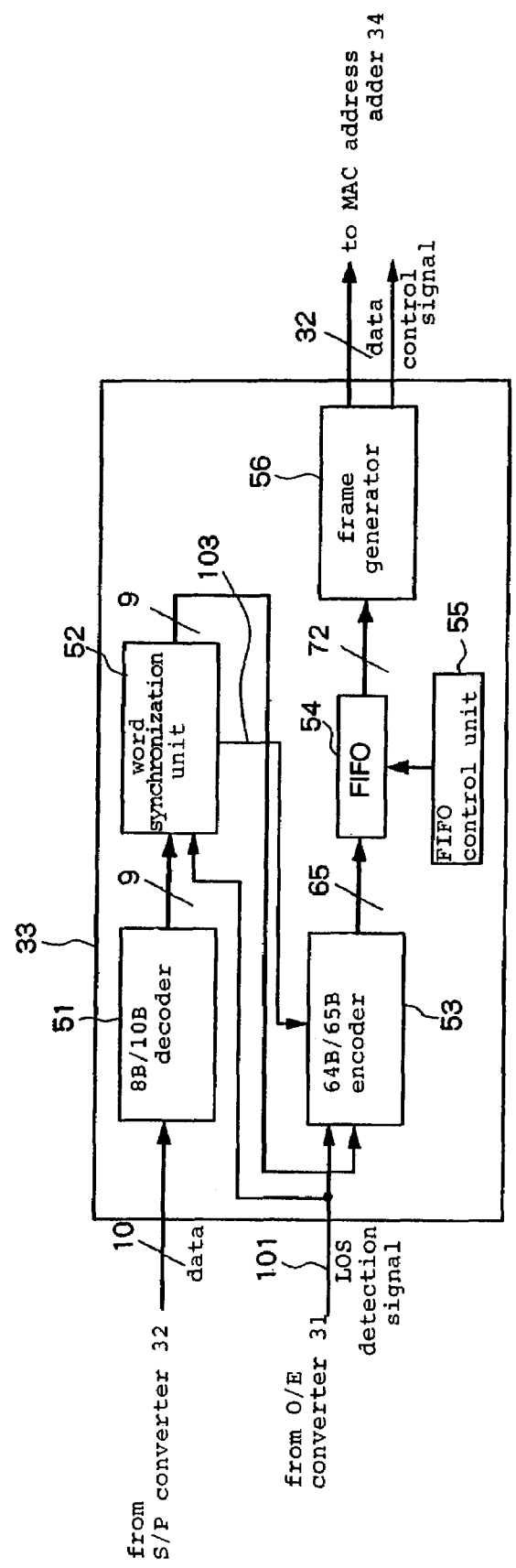
FIG. 10 is a block diagram showing the construction of FC-GbE converter 33 in FIG. 9.

We next refer to FIG. 10, which is a block diagram showing the construction of FC-GbE converter 33. FC-GbE converter 33 is a construction in which word synchronization detector 52 and 64B/65B encoder 53 replace word synchronization detector 152 and 64B/65B encoder 153 of FC-GbE converter 133 in converter 1201 of the prior art that is shown in FIG. 3.

Figure 3:
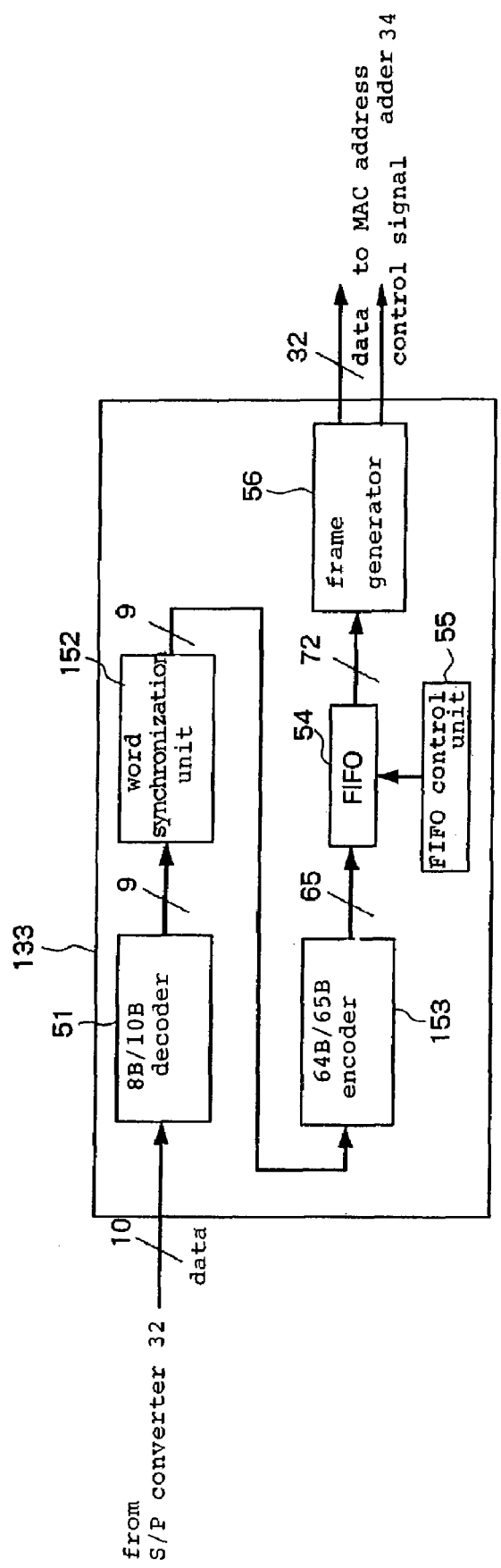
FIG. 3 is a block diagram showing the construction of FC-GbE converter 133 in FIG. 2.

In addition to the functions of word synchronization detector 152 that is shown in FIG. 3, word synchronization detector 52 is further provided with the capability to supply LCS detection signal 103 upon detecting a loss of character synchronization.

The input of LOS signal 101 to word synchronization detector 52 is for the purpose of determining whether the failure to detect word synchronization is a result of an interruption of the optical signals or a failure to realize character synchronization.

In addition to the functions of 64B/65B encoder 153 that is shown in FIG. 3, 64B/65B encoder 53 is further provided with the capability to perform processing to insert the alert information CSF-LOS or CSF-LCS in values that are not being used of the control character indicator in the 64B/65B encoding rules upon input of LOS detection signal 101 from O/E converter 31 or LCS detection signal 103 from word synchronization detector 52.

FIG. 11 shows a table of the relation between 8B/10B control characters and 64B/65B control codes in the multiplex transmission system of the present embodiment. The assignment of CSF-LOS and CSF-LCS to the control character indicators i1110i and i1111,i respectively, in the 64B/65B encoding rules in this table differs from the table in the prior-art multiplex transmission system that was shown in FIG. 7. CSF-LOS and CSF-LCS are signals for reporting from converter 201 to converter 202 that a client signal abnormality has occurred.

In other words, 64B/65B encoder 53 makes the four bits of the control character indicator of the compression control codes in 64B/65B codes "1110" when it receives LOS detection signal 101 as input from O/E converter 31, and makes the four bits "1111" when it receives LCS detection signal 103 from word synchronization detector 52.

Figure 12:
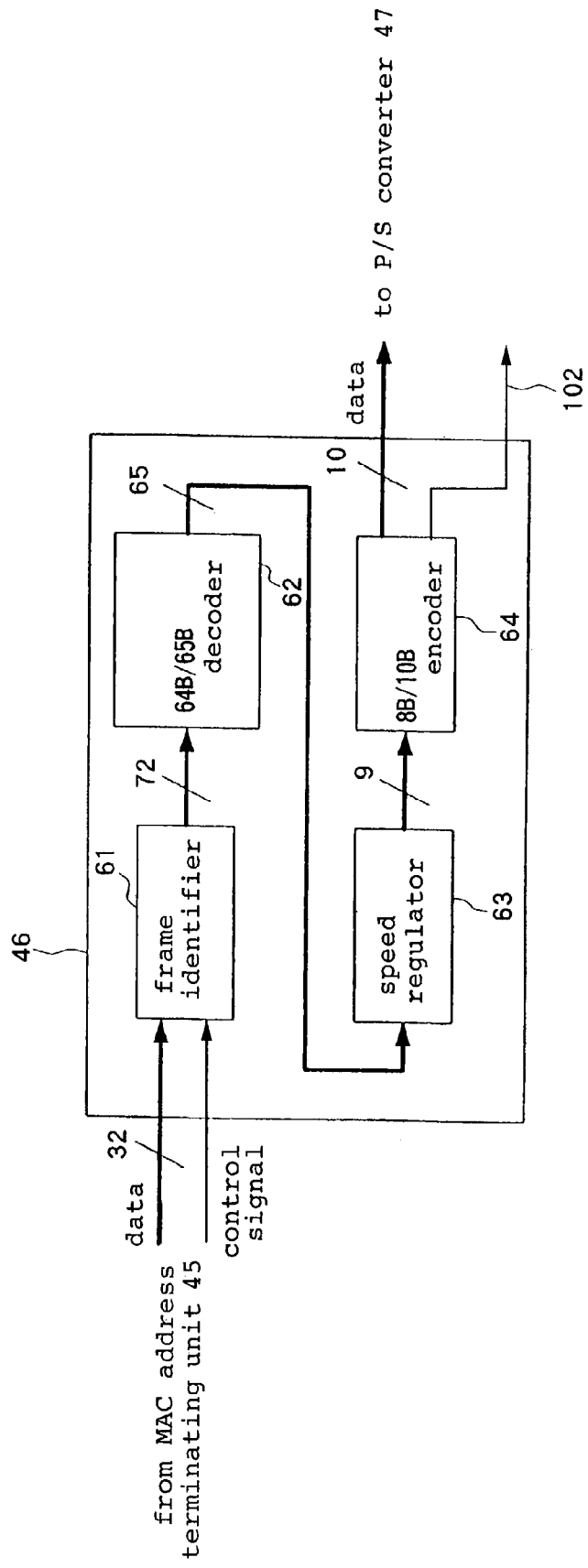
FIG. 12 is a block diagram showing the construction of GbE-FC converter 46 in FIG. 9.

We next refer to FIG. 12, which is a block diagram showing the construction of GbE-FC converter 46. GbE-FC converter 46 is a construction in which 8B/10B encoder 164 of GbE-FC converter 146 in converter 1201 of the prior art shown in FIG. 4 has been replaced by 8B/10B encoder 64.

Figure 4:
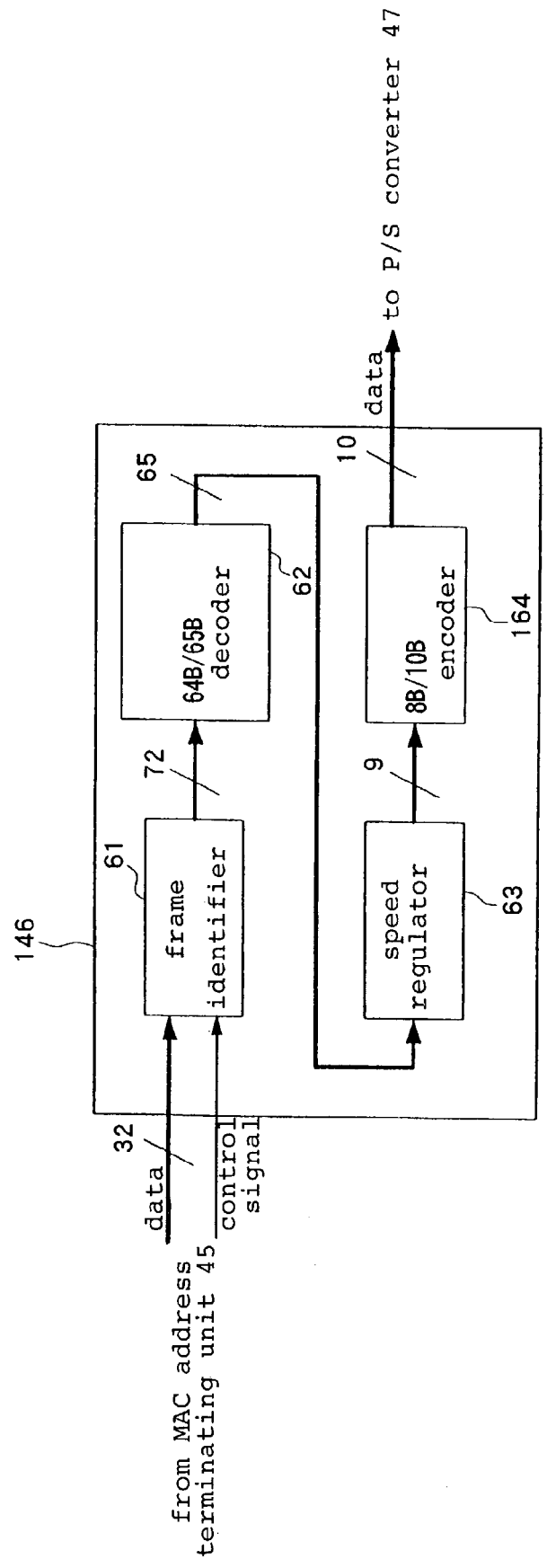
FIG. 4 is a block diagram showing the construction of GbE-FC converter 146 in FIG. 2.
Figure 5:
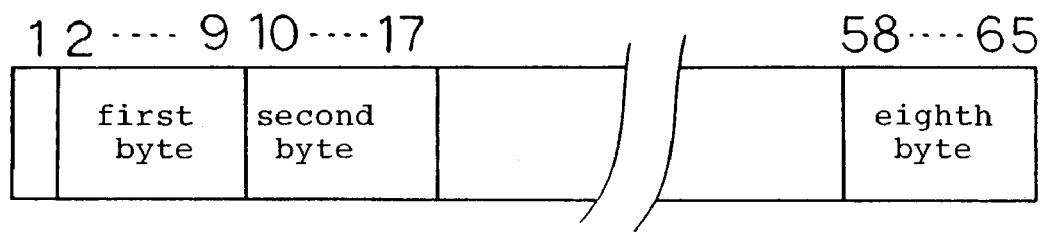
FIG. 5 shows the composition of a 64B/65B code.
Figure 6:
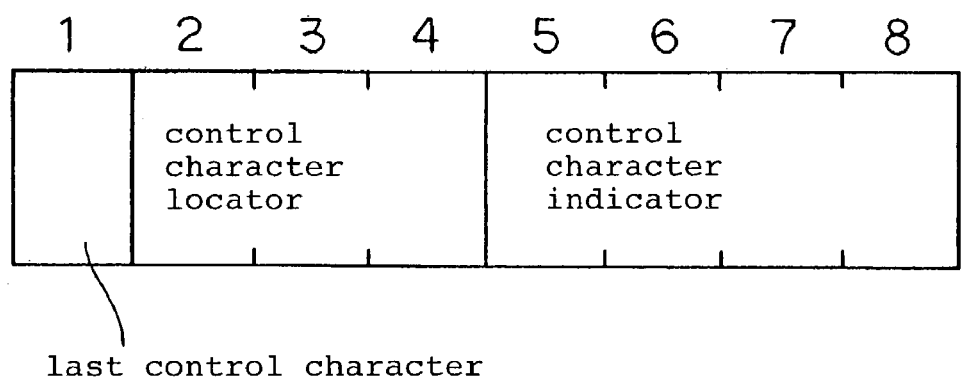
FIG. 6 shows the composition of compression control codes.

In addition to the functions of 8B/10B encoder 164 that is shown in FIG. 4, 8B/10B encoder 64 is further provided with the capability to supply optical output halt signal 102 as output to E/O converter 48 upon detecting that the four bits of the control character indicator of the compression control code in a 64B/65B code are "1110" or "1111".

Figure 13:
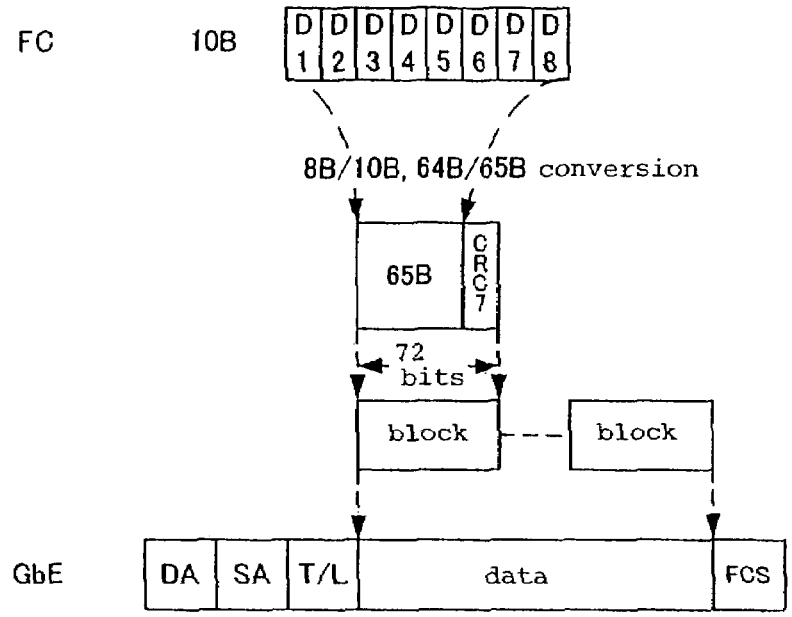
FIG. 13 shows a case in which converter 201 in the first embodiment of the present invention encapsulates the data of the Fibre Channel into GbE frames.

We next refer to FIG. 13, which shows a case in which the data of the Fibre Channel are encapsulated in GbE frames by converter 201 in the present embodiment. In the example of encapsulation that is shown in FIG. 13, seven bits of CRC (Cyclic Redundancy Check Code) are added to the data of 65 bits following 64B/65B conversion to produce a total of 72 bits, and these 72 bits are encapsulated as one block.

Figure 14:
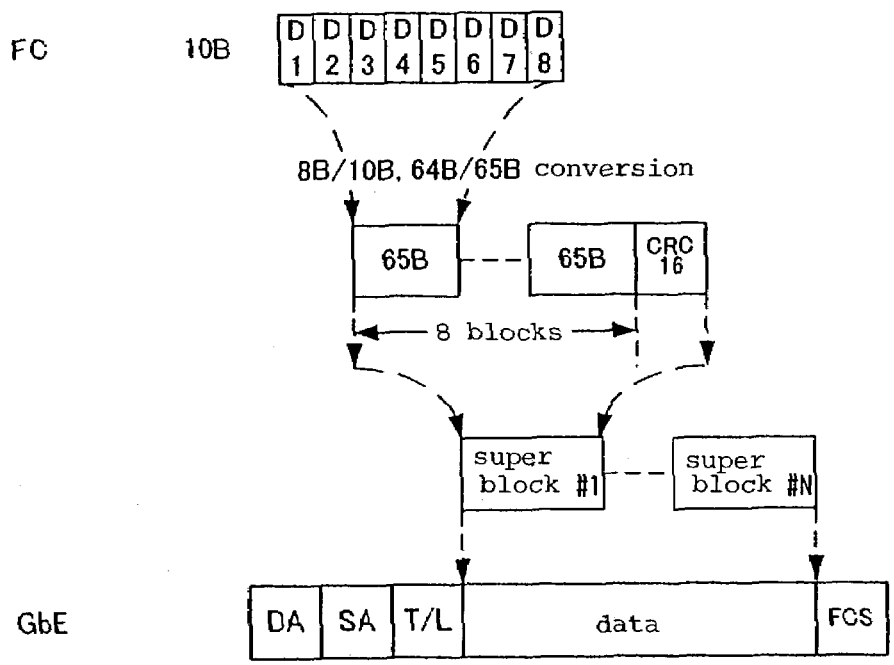
FIG. 14 shows a case in which converter 201 in the first embodiment of the present invention encapsulates the data of the Fibre Channel into GbE frames.

Another example is shown in FIG. 14 in which the data of the Fibre Channel are encapsulated in GbE frames by converter 201 in the present embodiment. In the encapsulation that is shown in FIG. 14, 65 bits of data are established as one block after 64B/65B conversion, and encapsulation is carried out to produce super blocks in which 16 bits of CRC are added to these eight blocks.

Figure 15:
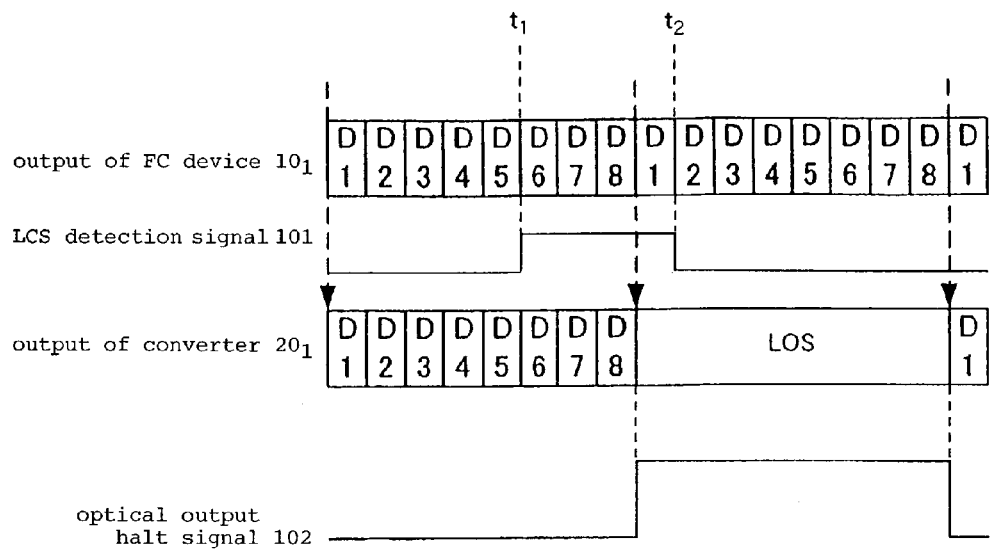
FIG. 15 is a timing chart showing the operation when a loss of optical input (LOS) occurs between FC device 101 and converter 201.

Referring now to the timing chart of FIG. 15, we next describe the operation in the event of a loss of signal (LOS) between FC device 101 and converter 201. In FIG. 15, when a problem such as the disconnection of an optical fiber cable occurs at time t1 and the input of optical signals to converter 201 is interrupted, O/E converter 31 supplies LOS detection signal 101 as output, whereupon 64B/65B encoder 53 of converter 201 inserts the alert information CSF-LOS into the control character indicator in the first 64B/65B code following the input of LOS detection signal 101. GbE converter 46 in converter 202 that has received this alert information generates and supplies optical output halt signal 102 as output. After recovery from the problem at time t2 and the cessation of LOS detection signal 101 as output, 64B/65B encoder 53 of converter 201 does not include CSF-LOS alert indication beginning from the first 64B/65B code that begins after time t2 at which recovery from the problem occurred. As a result, GbE-FC converter 46 in converter 202 halts the output of optical output halt signal 102.

Figure 16:
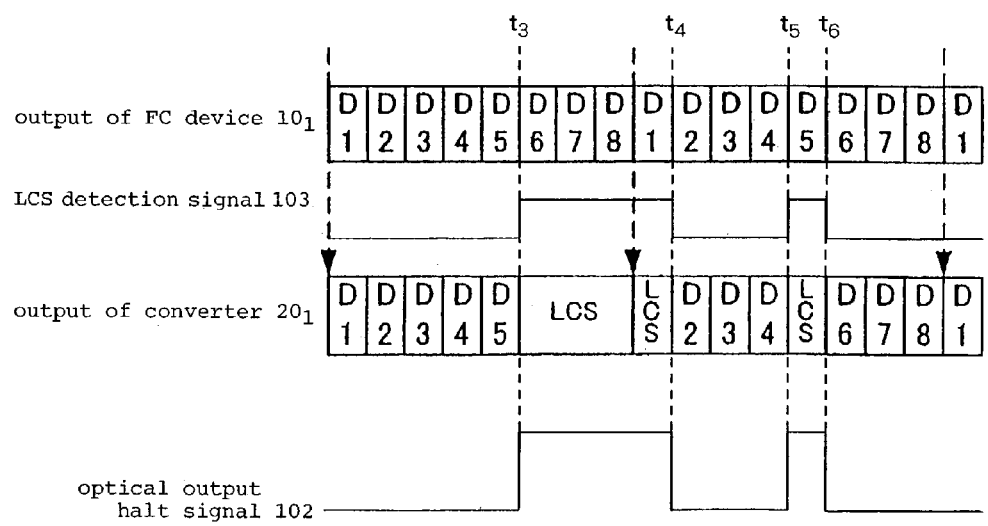
FIG. 16 is a timing chart showing the operation when a loss of character synchronization (LCS) occurs between FC device 101 and converter 201.

We next refer to the timing chart of FIG. 16 to explain the operation when a loss of character synchronization (LCS) occurs between FC device 101 and converter 201. In FIG. 16, some type of problem occurs at time t3 and converter 201 becomes unable to detect synchronization of data from FC device 101, whereupon word synchronization detector 52 in FC-GbE converter 33 supplies LCS detection signal 103 as output. 64B/65B encoder 53 then inserts alert information CSF-LCS into the control character indicators in 64B/65B codes. GbE converter 46 in converter 202 that has received this alert information generates and supplies optical output halt signal 102 as output. When recovery from the problem is realized at time t4 and LCS detection signal 103 is no longer supplied as output, 64B/65B encoder 53 of converter 201 no longer includes the alert indicator CSF-LOS in the control character indicators of the generated 64B/65B codes. As a result, GbE-FC converter 46 in converter 202 halts the output of optical output halt signal 102. The control of optical output halt signal 102 is also realized similarly at times t5 and t6.

Figure 17:
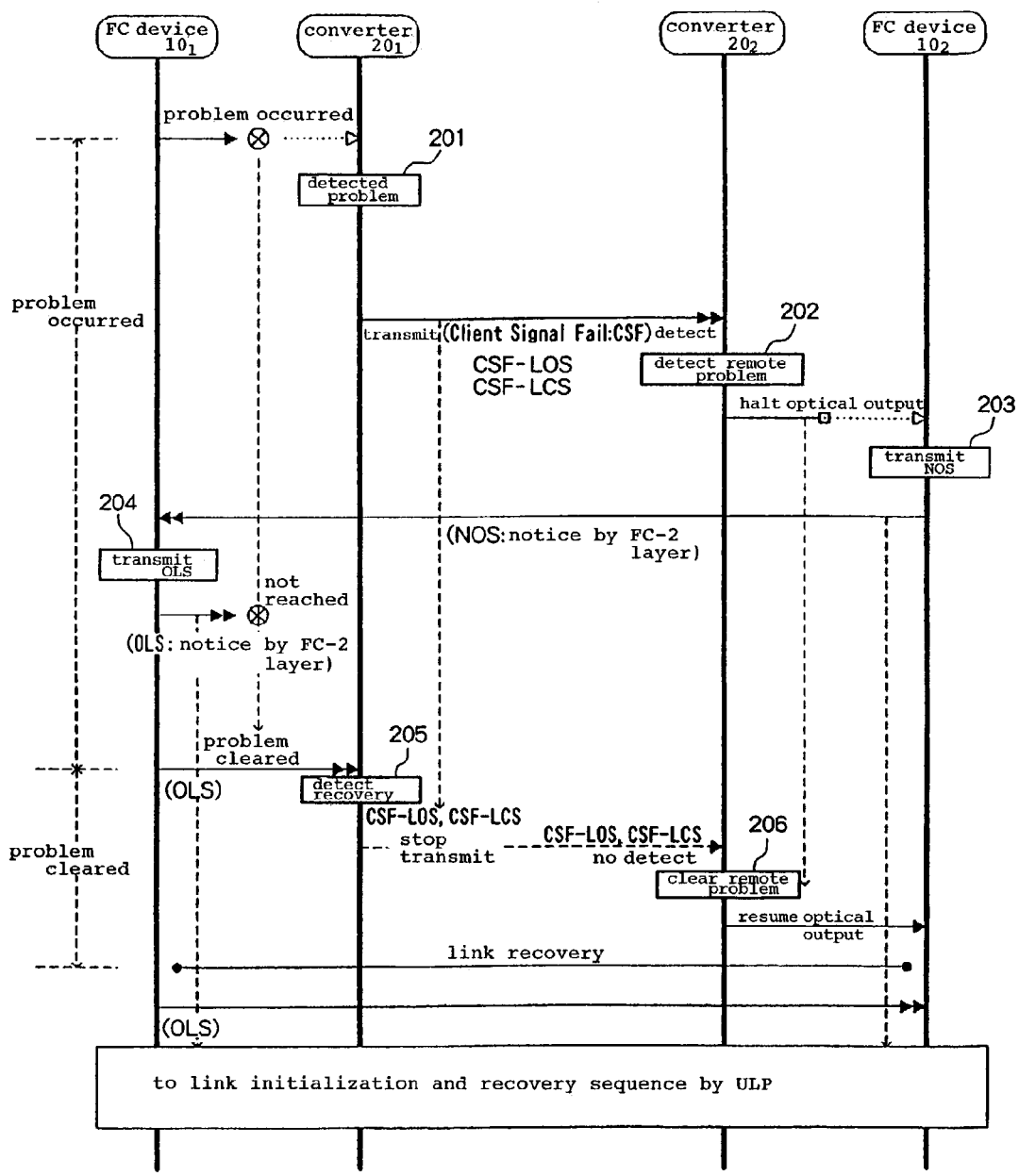
FIG. 17 is a sequence chart for explaining the operation when a problem occurs between FC device 101 and converter 201 in the multiplex transmission system of the first embodiment of the present invention.

Referring now to the sequence chart of FIG. 17, we next describe the operations when a problem has occurred between FC device 101 and converter 201 in the multiplex transmission system of the present embodiment.

In step 201, when a problem of some type has occurred between FC device 101 and converter 201 as described in the foregoing explanation, converter 201 inserts alert information indicating that an abnormality has occurred in the client signal (CSF-LOS or CSF-LCS) into the control character indicators of the 64B/65B codes and transmits these blocks to converter 202.

In step 202, converter 202, having received this alert information from converter 201, recognizes that the client signal has become abnormal due to the occurrence of a problem and halts the output of the optical signals to FC device 102.

In step 203, FC device 102 detects that the transmission of optical signals from converter 202 has been halted, determines that some type of problem has occurred, and communicates NOS indicating that data have not arrived to FC device 101 by an FC-2 layer.

In step 204, FC device 101 receives this NOS from FC device 102 and responds with OLS to report that NOS has been received. This OLS from FC device 101 does not reach converter 201 due to the problem between FC device 101 and converter 201. However, FC device 101 is at least able to detect that the data that it has sent have not arrived at FC device 102 due to some type of problem and therefore halts the transmission of data to FC device 102.

When the problem between FC device 101 and FC device 102 has been cleared, the OLS from FC device 101 reaches converter 201, and in step 205, converter 201 detects that the problem has been cleared and halts the transmission of CSF-LOS or CSF-LCS. As a result, converter 202 detects that the problem between FC device 101 and converter 201 has been cleared and resumes the optical output to FC device 102 in step 206.

When the above-described processing has been performed and FC device 102 receives the OLS from FC device 101, FC device 102 determines that the problem has been cleared. The link between FC devices 101 and 102 is then initialized and a clear-forward sequence is started.

As described in the foregoing explanation, when a problem occurs between FC device 101, which is the client device on the transmitting side, and converter 201 in the multiplex transmission system of the present embodiment, values that are not being used of the values of four bits of the control character indicators of 64B/65B codes are used to report this occurrence of a problem to converter 202. Converter 202 therefore halts the optical output to FC device 102, whereby FC device 102 is able to recognize the occurrence of a problem. FC device 102 transmits to FC device 101 an indication that it has recognized the occurrence of a problem, whereby the occurrence of the problem can also be recognized at FC device 101. In this way, the occurrence of a problem can be recognized at FC devices 101 and 102 on both the transmitting side and the receiving side, and a clear-forward sequence can be started when the problem has been cleared.

Initialization

Although a case was described in the present embodiment in which FC device 101 and FC device 102 are connected by a single line, connecting the devices by another line would allow the possibility of switching to the other line when the occurrence of a problem is detected.

Although a case was described in the present embodiment in which the optical output from converter 202 to FC device 102 is halted when a problem occurs between FC device 101, which is the client device on the transmitting side, and converter 201; a 10B-ERR signal for reporting the occurrence of an abnormality may also be sent without halting the optical output. In such a case, the same effect can be obtained as for a case in which the optical output is halted if FC device 102 transmits an NOS to FC device 101 when it receives the 10B-ERR signal from converter 202.

Figure 18:
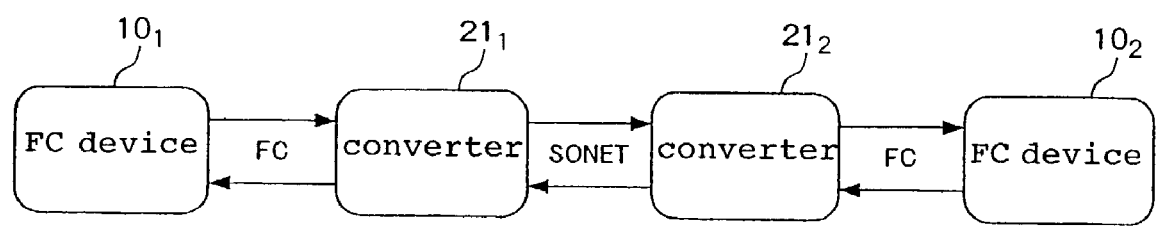
FIG. 18 is a block diagram showing the construction of the multiplex transmission system of the second embodiment of the present invention.

Second Embodiment:

We next refer to FIG. 18, which is a block diagram showing the construction of the multiplex transmission system of the second embodiment of the present invention. In FIG. 18, constituent elements that are identical to constituent elements in FIG. 8 are identified by the same reference numerals, and redundant explanation of these elements is here omitted.

The multiplex transmission system of this embodiment is a construction in which converters 201 and 202 of the multiplex transmission system of the first embodiment that is shown in FIG. 8 are replaced by converters 211 and 212.

In the multiplex transmission system of the first embodiment that was previously described, the transmission path was GbE, but in the multiplex transmission system of this embodiment, the present invention is applied to a case in which the transmission path is a SONET (Synchronous Optical Network).

In the multiplex transmission system of the present embodiment, converters 211 and 212 convert the Fibre Channel signals from FC devices 101 and 102 to frames based on a GFP (Generic Framing Procedure) and then transmit the signals to the transmission path.

As with the multiplex transmission system of the first embodiment that was previously described, converters 211 and 212 in the multiplex transmission system of the present embodiment also transmit alert information by inserting the alert information CSF-LOS or CSF-LCS into unused values within the compression control codes in 64B/65B codes.

Figure 19:
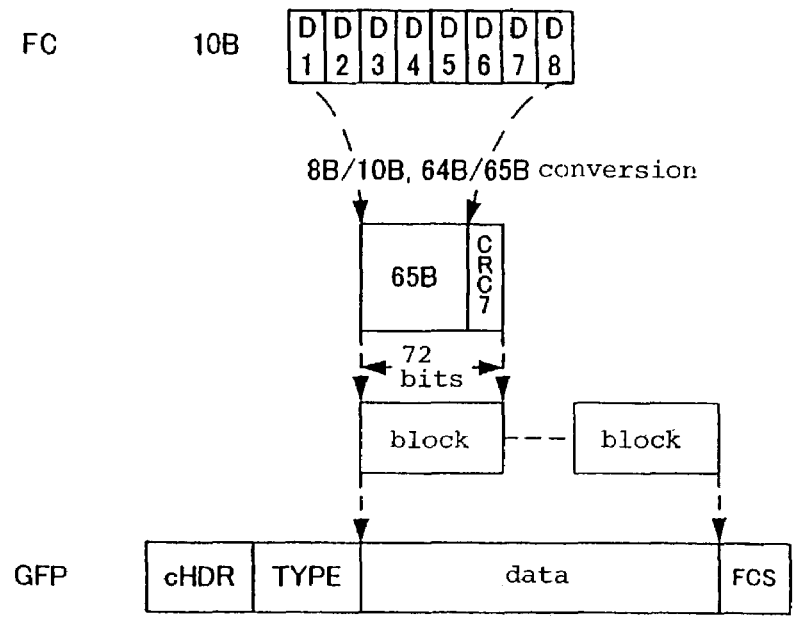
FIG. 19 shows a case in which converter 211 in the second embodiment of the present invention encapsulates Fibre Channel data in GFP frames.

FIG. 19 shows an example of encapsulation of the Fibre Channel data into GFP frames by converter 211 in the present embodiment. As with the example of encapsulation that is shown in FIG. 13, in the example of encapsulation that is shown in FIG. 19, seven bits of CRC are added to the 65 bits of data after 64B/65B conversion to produce a total of 72 bits, and these 72 bits are encapsulated as a single block.

Figure 20:
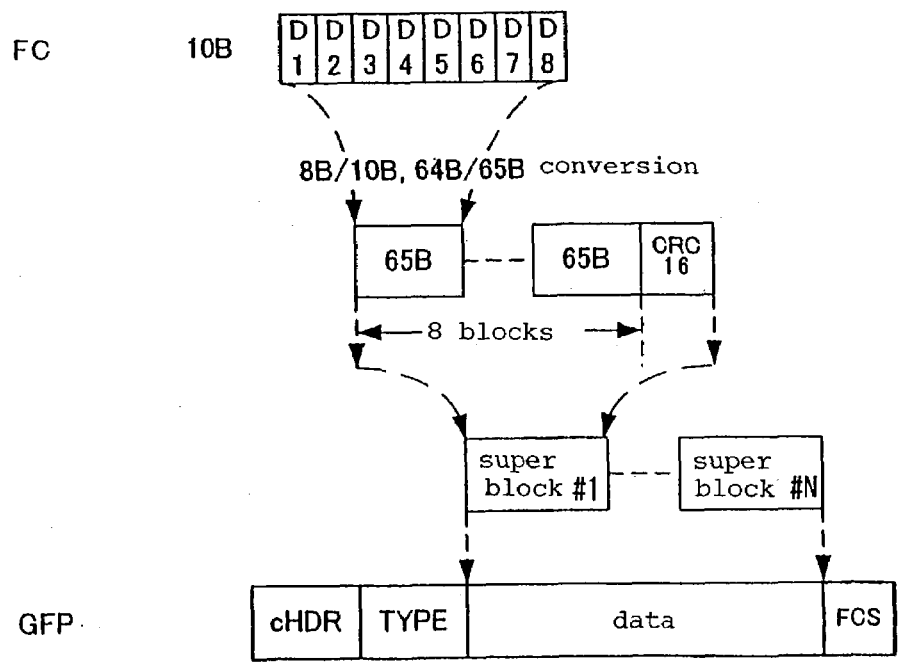
FIG. 20 shows a case in which converter 211 in the second embodiment of the present invention encapsulates Fibre Channel data in GFP frames.

FIG. 20 shows another example of encapsulation of the Fibre Channel data into GFP frames by converter 211 in the present embodiment. As in the example of encapsulation that is shown in FIG. 14, in the example of encapsulation shown in FIG. 20, 65 bits of data following 64B/65B conversion are taken as one block, and encapsulation is carried out to produce super blocks in which 16 bits of CRC are added to these eight blocks.

As in the above-described multiplex transmission system of the first embodiment, the multiplex transmission system of this embodiment allows four bits of the control character indicator to be used to transfer alert information for reporting the occurrence of a problem when a problem occurs between FC device 101, which is the client device on the transmitting side, and converter 211.

In the multiplex transmission system of the prior art as well, the transmission of alert information was possible when the transmission path was a SONET if alert frames were used for transmitting alert information separate from user frames. However, the use of the multiplex transmission system of the present embodiment allows the transmission of alert information without using frames such as alert frames that are specifically for this purpose. As a result, alert information can be transmitted to converter 212 on the receiving side without reducing the data transfer rate and without requiring processing such as the generation of alert frames.

Cases have been described in the above-described first and second embodiments in which the present invention is applied to a multiplex transmission system is which data from a client device that have been encoded using 8B/10B encoding rules are converted to data that are based on the standard of the transmission path after 64B/65B conversion by means of a converter and then transmitted, but the present invention is not limited to this form. The present invention can be similarly applied to a multiplex transmission system in which data from a client device that have been encoded using certain encoding rules are converted by a converter to data that are based on the standard of the transmission path and then transmitted. In such a case, when a problem occurs between the converter and client device on the transmitting side, the converter on the transmitting side should transmit to the converter on the receiving side alert information indicating that a problem has occurred by using values that are not being used of control codes in which the relation between control information and values is defined.

While preferred embodiments of the present invention have been described using specific terms, such description is for illustrative purposes only, and it is to be understood that changes and variations may be made without departing from the spirit or scope of the following claims.

What is claimed is:

1. A multiplex transmission system that converts data from a client device that have been encoded using particular encoding rules to data that are based on standards of a transmission path, using a converter, and then transmits said data, said system comprising:

a transmission path having a predetermined transmission signal format including a plurality of data codes for transmitting data and a plurality of control codes for transmitting control information, wherein one or more values of said control codes comprises an unused control code in that there is no relation defined between said value and control information;

a first client device at a first end of said transmission path, said first client devices using a predetermined interface format;

a first converter coupled with said first client device, said first converter converting signals received from said first client device in said predetermined interface format into said predetermined transmission signal format and converting signals received from said transmission path in said predetermined transmission signal format into said predetermined interface format for said first client device, wherein said first client device and said first converter can serve as either a transmitting side or a receiving side;

a second client device at a second end of said transmission path, said second client device using said predetermined interface format; and a second converter coupled with said second client device to convert signals to and from said predetermined transmission format and said predetermined interface format, wherein said second client device and said second converter can also serve as either a transmitting side or a receiving side, wherein, a conveter on a transmitting side comprises an encoder that uses one or more of said unused control code values to transmit to a converter on a receiving side alert information indicating that a problem has occurred between the converter on the transmitting side and the client device on the transmitting side, wherein said converter on the receiving side, upon receiving said alert information from the converter on the transmitting side, transmits a signal to the client device on the receiving side, indicating that a problem on the transmitting side has occurred.

2. A multiplex transmission system according to claim 1, wherein said alert information comprises information indicating an occurrence of a loss of optical input, which comprises a state in which optical signals to the converter from the client device on the transmitting side have been interrupted, or a loss of character synchronization, which comprises a state in which synchronization of data from the client device cannot be obtained in the converter.

3. A multiplex transmission system according to claim 1, wherein said converter on the receiving side, upon receiving alert information front the converter on the transmitting side, baits an output of optical signals to the client device on the receiving side.

4. A multiplex transmission system according to claim 3, wherein said client device on the receiving side, upon detecting a halt of input of optical signals from the converter on the receiving side, sends a reply to the client device on the transmitting side to indicate that data have not arrived.

5. A multiplex transmission system according to claim 1, wherein said client device on the receiving side, upon receiving a signal indicating that a problem has occurred from said converter on the receiving side, sends a reply to the client device on the transmitting side indicating that data have not arrived.

6. A multiplex transmission system. according to claim 1, wherein said client device comprises a Fibre Channel device for transmitting data to and receiving data from a converter using Fibre Channel signals.

7. A multiplex transmission system that converts data from a client device that have been encoded using 8B/10B encoding rules to data based on standards of a transmission path after 64B/65B conversion, using a converter, and then transmits said data, said system comprising:

a transmission path having said 64B/65B transmission signal format including a plurality of data codes for transmitting data and a plurality of compression control codes for transmitting compression control information, wherein one or more values of said compression control codes comprises an unused compression control code in that there is no relation defined between said value and compression control information;

a first client device at a first end of said transmission path, said first client device using said 8B/10B interface format;

a first converter asseeleted coupled with said first client device, said first converter converting signals received from said first client device in said predetermined interface format into said predetermined transmission signal format and converting signals received from said transmission path in said predetermined transmission signal format into said predetermined interface format for said first client device, wherein said first client device and said first converter can serve as either a transmitting side or a receiving side;

a second client device at a second end of said transmission path, said second client device using said predetermined interface format; and a second converter coupled with said second client device to convert signals to and from said predetermined transmission format and said predetermined interface format, wherein said second client device and said second converter can also serve as either a transmitting side or a receiving side, wherein, a converter on a transmitting side comprises an encoder that uses one or more of said unused compression control code values to transmit to a converter on a receiving side alert information indicating an occurrence of a problem has occurred between the converter on the transmitting side and the client device on the transmitting side, wherein said converter on the receiving side, upon receiving said alert information from the convener on the transmitting side, transmits a signal to the client device on the receiving side, indicating that a problem on the transmitting side has occurred.

8. A multiplex transmission system according to claim 7, wherein said alert information comprises information indicating an occurrence of a loss of optical input, which comprises a state in which optical signals to the converter from the client device on the transmitting side have been interrupted, or a loss of character synchronization, which comprises a state in which synchronization of data from the client device cannot be obtained in the converter.

9. A multiplex transmission system according to claim 7, wherein said converter on the receiving side, upon receiving alert information from the converter on the transmitting side, halts an output of optical signals to the client device on the receiving side.

10. A multiplex transmission system according to claim 9, wherein said client device on the receiving side, upon detecting a halt of input of optical signals from the converter on the receiving side, sends a reply to the client device on the transmitting side to indicate that data have not arrived.

11. A multiplex transmission system according to claim 7, wherein said client device on the receiving side, upon receiving a signal indicating that a problem has occurred from said converter on the receiving side, sends a reply to the client device on the transmitting side indicating that data have not arrived.

12. A multiplex transmission system according to claim 7, wherein said client device is a Fibre Channel device for transmitting data to and receiving data from a converter using Fibre Channel signals.

13. A converter for converting received data from a coupled client device, said coupled client device encoding input data using particular encoding rules to data based on the standards of a transmission path; said converter comprising:
    a means for, when a problem occurs between said converter and the client device on the transmitting side, using value that are not being used of control codes for which the relation between control information and values is defined to transmit to a converter on the receiving side alert information indicating that a problem has occurred.

14. A converter according to claim 13, wherein said alert information comprises information indicating an occurrence of loss of optical input, which comprises a state in which optical signals from the client device on a transmitting side to the converter have been interrupted, or a loss of chancier synchronization, which comprises a state in which synchronization of data from the client device cannot be realized in the converter.

15. A converter according to claim 13, wherein said converter, upon receiving alert information from the converter on the transmitting side, halts the output of optical signals to the client device on the receiving side.

16. A method of transmitting an alert in a multiplex transmission system in which data from a client device that have been encoded using particular encoding rules are converted to data based on standards of a transmission path and then transmitted, said encoding rules including a plurality of data codes for transmitting data and a plurality of control codes for transmitting control information, including one or more unused control code values the method comprising:
    a step in which, when a problem occurs between a converter and a coupled client device on a transmitting side, the converter on the transmitting side uses one or more of said unused code values to transmit to a converter on a receiving side alert information indicating that a problem has occurred between said converter and its associated client device;
    a step in which a converter on a receiving side that has received the alert infrnnation from the converter on the transmitting side halts an output of optical signals to its associated client device on the receiving side; and
    a step in which the client device on the receiving side, upon detecting that optical signals from the converter on the receiving side have been halted, transmits a signal to the client device on the transmitting side indicating that data have not arrived.

17. A method of transmitting an alert in a multiplex transmission system in which data from a client device that have been encoded an 8B/10encoding rules to data based on standards of a transmission path after a 64B/65B conversion and then transmitted, said encoding rules including a plurality of data codes for transmitting data and a plurality of compression control codes for transmitting control information, said plurality of compression control codes including one or more unused compression control code values, the method comprising:
    a step in which, when a problem occurs between a converter and a coupled client device on a transmitting side, the converter on the transmitting side uses one or more of said unused compression control code values used to transmit to a converter on a receiving SIDE alert information indicating that a problem has occurred on said transmitting side; and
    a step in which a converter on the receiving side that has received the alert information from the converter on the transmitting side halts an output of optical signals to its associated client device on the receiving side; and
    a step in which the client device on the receiving side, upon detecting that optical signals from the convener on the receiving side have been halted, transmits a signal to the client device on the transmitting side indicating that data have not arrived.

18. A method of transmitting an alert according to claim 16, further comprising a step in which the client device on the transmitting side, upon receiving a signal indicating data have not arrived from the client device on the receiving side, sends a reply to the client device on the receiving side indicating that the signal has been received.

19. A method of transmitting an alert according to claim 17, further comprising a step in which the client device on the transmitting side, upon receiving a signal indicating data have not arrived from the client device on the receiving side, sends a reply to the client device on the receiving side indicating that the signal has been received.

* * * * *